United States Patent [19]

van Rooijen

[11] 4,286,673

[45] Sep. 1, 1981

[54] BASKET-SHAPED DUAL-FUNCTION HOE-RAKE

[75] Inventor: Rudolf J. A. M. van Rooijen, Breda, Netherlands

[73] Assignee: Bertha-Maria van Rooijen-Nieuwenhijs, Breda, Netherlands

[21] Appl. No.: 50,692

[22] Filed: Jun. 21, 1979

[30] Foreign Application Priority Data

Jun. 26, 1978 [NL] Netherlands .................. 7806870

[51] Int. Cl.³ .................................................. A01B 1/14
[52] U.S. Cl. .................................... 172/378; 56/400.01
[58] Field of Search ..................... 172/378; 56/400.01, 56/400.21; 294/19 A, 50.6, 50.7, 99 R; D8/13

[56] References Cited

U.S. PATENT DOCUMENTS

| 314,373 | 3/1885 | Gibbs | 56/400.21 X |
| 1,723,091 | 8/1929 | St. John | 294/19 A |
| 1,972,727 | 9/1934 | Zimmermann | 172/378 |
| 2,056,411 | 10/1936 | Schulz | 56/400.01 |
| 2,972,851 | 2/1961 | Goehring | 294/19 A X |

FOREIGN PATENT DOCUMENTS

| 24322 | of 1901 | United Kingdom | 294/19 A |
| 452157 | 8/1936 | United Kingdom | 56/400.01 |
| 718163 | 11/1954 | United Kingdom | 172/387 |
| 1423381 | 2/1976 | United Kingdom | 294/19 A |

Primary Examiner—Richard T. Stouffer
Attorney, Agent, or Firm—Becker & Becker, Inc.

[57] ABSTRACT

A hoe-rake including a flat, wide-meshed basket-shaped structure attached to a shaft. The basket-shaped structure includes radially placed strips or wires in two horizontal planes, connected by way of vertical strips or wires, the strips or wires in the lower horizontal plane being formed as inwardly pointing prongs.

4 Claims, 2 Drawing Figures

BASKET-SHAPED DUAL-FUNCTION HOE-RAKE

The present invention relates to a device for hoeing.

SUMMARY OF THE INVENTION

It is known in the art to use for hoeing a slightly bent, blunt blade attached to a handle or shaft that is moved back and forth in the top layer of the soil between the plants.

A disadvantage of this known device is that the plants between which the weeds have to be removed are often touched and damaged by the tip of the blade. To avoid this, it is necessary to perform the hoeing with the utmost care, as a result of which hoeing with the known devices is a time-consuming, exacting and trying operation.

The object of the invention is to provide an improved hoeing device which avoids these disadvantages. The hoeing device according to the invention comprises a wide-mesh basket-shaped structure having a substantially elongated axial cross-section consisting of strip- or wire-shaped material, such as round wire, which strips or wires are arranged in a substantially radial position in the upper and lower horizontal planes of the basket, the strips or wires which connect both horizontal planes being substantially vertical in direction. As a result of the basket shape of the device it is unlikely that during the hoeing operation the device is caught in the plants which have to be spared from damage. This results in the hoeing operation becoming less exacting and trying.

In a preferred embodiment of the hoeing device according to the invention the corner regions between the strips or wires in the upper horizontal plane and the verticaly positioned strips or wires are connected by means of circular strips or wires. This contributes to the object of the invention by making it even more difficult to damage the plants when they are touched by the device. It is even possible to use the device in a slightly tilted position, it being possible to move the device between the plants which are planted quite closely without impairing the hoeing operation. Moreover it is possible to move the device at an oblique angle to the left or to the right, which is impossible with conventional hoeing devices.

In another preferred embodiment of the invention the basket consists of round wire, of which the inwardly pointing prongs of the lower horizontal plane have been flattened by rolling or sharpening, so as to facilitate the cutting of the weed plants near the surface of the soil.

In another preferred embodiment the shaft is attached eccentrically to the upper horizontal plane of the basket thus extending the radius of action of the device when the shaft is slightly turned.

The hoeing device according to the invention has an additional advantage over conventional devices, which is, that after the hoeing operation the soil has a uniformly loosened surface. As a result it is not necessary afterwards to rake the soil, as is usual with conventional hoeing devices. The device thus performs two soil-working functions at the same time, viz. hoeing and raking, for which reason the device according to the invention may be conveniently termed a "hoe-rake".

The invention is illustrated in the accompanying drawings which show one of the embodiments of the hoeing device.

DESCRIPTION OF THE PREFERRED EMBODIMENTS

Figure 1:
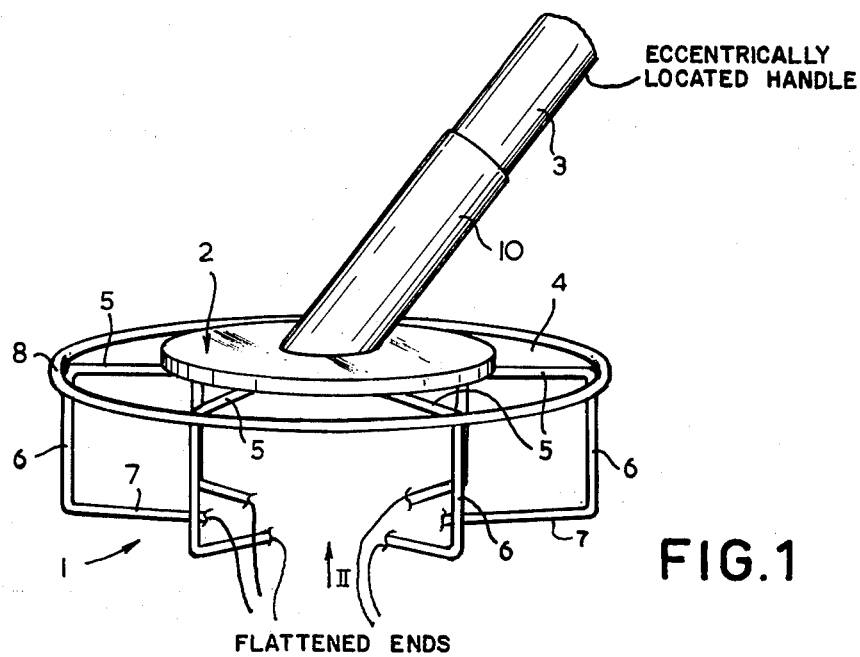
FIG. 1 shows a perspective view of the hoe-rake according to the invention, provided with a handling shaft.
Figure 2:
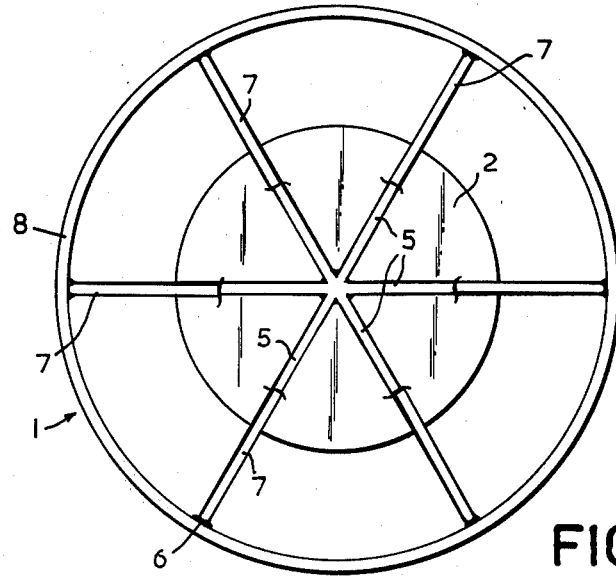
FIG. 2 shows a bottom view according to line II in FIG. 1.

A basket-shaped structure 1 is constructed from round wire, e.g. from stainless steel, which structure is suspended from a central disc 2. This disc 2 is attached to the shaft 3 by conventional means such as a socket in the shape of a truncated cone. From the disc 2 the round wire extends radially in the upper horizontal plane 4 with parts 5, then bends vertically downwards with parts 6, which parts at their lower ends are formed as inwardly directed prongs 7.

The corner regions between the parts 5 and the parts 6 are connected by means of a ring 8, likewise consisting of round wire.

The inwardly pointing prongs in the lower horizontal plane have been flattened by rolling or sharpening. The handle is secured in an eccentric position with respect to the center line or central axis "C" of the basket-shaped structure to the upper horizontal plane 4 of the basket-shaped structure.

In summary, the present invention concerns a dual-function hoe-rake, which includes a wide-mesh basket-shaped structure having a central axis, a handle, and means for operatively connecting the handle and the basket-shaped structure. The basket-shaped structure further includes a plurality of first wires which extend radially outwardly from the central axis of the structure as well as a plurality of second wires which are connected to pertaining first wires and extend in an axial direction away from the handle, and a plurality of third wires which are connected to pertaining second wires and extend in the form of prongs radially inwardly part of the way toward the central axis. The third wires have free ends; the first and third wires are respectively located in planes which are substantially parallel to one another; the second wires extending substantially perpendicular to said planes. The first, second, and third wires are arranged as a continuous wire. At least one annular member respectively is connected to at least one of said planes of radially extending first and third wires and the axially extending second wires in the vicinity of the transition in direction of the wires. At least the free ends of the third wire prongs are flattened. The handle is operatively connected to the plane of first wires in such a way as to be eccentric to the central axis of said basket-shaped structure.

It will be clear that the invention is not restricted to this specific embodiment, a wide range of variations being possible as to the shape of the basket, the shape and number of the strips or wires, the construction etc. without departing from the scope of the invention.

What I claim is:
1. A dual-function hoe-rake, which comprises:
a wide-mesh basket-shaped structure having a central axis;
a handle; and
means for operatively connecting said handle and said basket-shaped structure, said wide-mesh basket-shaped structure having improvement in combination therewith comprising a plurality of first wires which extend directly radially outwardly from said central axis of said structure, a plurality of second wires which are connected substantially at right angles to said first wires belonging therewith and which extend in an axial direction away from said handle, and a plurality of third wires which are connected substantially at right angles to said second wires belonging therewith and extend in the form of prongs projecting directly radially inwardly only part of the way toward said central axis, said third wires having flattened ends located radially of said central axis, said first and third wires being respectively located in axially spaced planes which are substantially parallel to one another, said second wires extending substantially perpendicular to said axially spaced planes.

2. A dual-function hoe-rake in combination according to claim 1, in which pertaining said first, second, and third wires are a continuous wire.

3. A dual-function hoe-rake in combination according to claim 1, which includes at least one annular member respectively connected to at least one of said planes of radially extending first and third wires and said axially extending second wires in the vicinity of the transition in direction of said wires.

4. A dual-function hoe-rake in combination according to claim 1, in which said handle is operatively connected to said plane of first wires in such a way as to be eccentric to said central axis of said basket-shaped structure.

* * * * *